US012600386B2

(12) United States Patent
Singh

(10) Patent No.: US 12,600,386 B2
(45) Date of Patent: *Apr. 14, 2026

(54) VEHICLE DRIVING ASSIST SYSTEM WITH DRIVER ATTENTIVENESS ASSESSMENT

(71) Applicant: MAGNA ELECTRONICS INC.,
Auburn Hills, MI (US)

(72) Inventor: Harjeet Singh, Aschaffenburg (DE)

(73) Assignee: MAGNA ELECTRONICS INC.,
Auburn Hills, MI (US)

( * ) Notice: Subject to any disclaimer, the term of this patent is extended or adjusted under 35 U.S.C. 154(b) by 352 days.

This patent is subject to a terminal disclaimer.

(21) Appl. No.: 18/051,956

(22) Filed: Nov. 2, 2022

(65) Prior Publication Data

US 2023/0288928 A1 Sep. 14, 2023

Related U.S. Application Data

(63) Continuation of application No. 15/889,397, filed on Feb. 6, 2018, now Pat. No. 11,493,918.

(Continued)

(51) Int. Cl.
*B60W 60/00* (2020.01)
*B60W 30/14* (2006.01)
(Continued)

(52) U.S. Cl.
CPC ........ *B60W 60/0059* (2020.02); *B60W 30/14* (2013.01); *B60W 40/08* (2013.01);
(Continued)

(58) Field of Classification Search
None
See application file for complete search history.

(56) References Cited

U.S. PATENT DOCUMENTS 5,550,677 A 8/1996 Schofield et al.
5,594,222 A 1/1997 Caldwell
(Continued)

FOREIGN PATENT DOCUMENTS

WO 2015165787 A1 11/2015
WO 2016162207 A1 10/2016
WO WO2016162207 * 10/2016

OTHER PUBLICATIONS

Dorin Aiteanu, Machine translation of WO2016162207, pp. 1-23 (Year: 2016).*

*Primary Examiner* — Hongye Liang
(74) *Attorney, Agent, or Firm* — HONIGMAN LLP

(57) ABSTRACT

A vehicular driving assist system includes a camera disposed in a vehicle and at least viewing driver hand positions of hands of a driver present in the vehicle. The vehicular driving assist system determines driver hand positions via processing of image data captured by the camera. The vehicular driving assist system compares determined driver hand positions to a plurality of discrete driver hand positions, which includes (i) a plurality of discrete driver hand positions at a steering wheel of the vehicle, and (ii) a plurality of discrete driver hand positions at an interior portion of the vehicle and not at the steering wheel of the vehicle. The vehicular driving assist system, responsive to processing of image data captured by the camera and based at least in part on comparison of determined driver hand positions to the plurality of discrete driver hand positions, determines a level of attentiveness of the driver.

27 Claims, 10 Drawing Sheets

Related U.S. Application Data

(60) Provisional application No. 62/457,393, filed on Feb. 10, 2017.

(51) Int. Cl.

| | |
|---|---|
| *B60W 40/08* | (2012.01) |
| *B60W 50/08* | (2020.01) |
| *B62D 1/04* | (2006.01) |
| *B62D 15/02* | (2006.01) |
| *G08G 1/16* | (2006.01) |

(52) U.S. Cl.

CPC ........ *B60W 50/08* (2013.01); *B60W 60/0051* (2020.02); *B62D 1/046* (2013.01); *B62D 15/025* (2013.01); *G08G 1/167* (2013.01); *B60W 2040/0818* (2013.01); *B60W 2420/24* (2013.01); *B60W 2420/403* (2013.01); *B60W 2520/10* (2013.01); *B60W 2540/22* (2013.01); *B60W 2540/223* (2020.02); *B60W 2540/225* (2020.02); *B60W 2540/229* (2020.02); *B60W 2540/26* (2013.01); *B60W 2540/30* (2013.01); *B60W 2555/20* (2020.02)

(56) References Cited

U.S. PATENT DOCUMENTS

| | | | |
|---|---|---|---|
| 5,670,935 | A | 9/1997 | Schofield et al. |
| 5,949,331 | A | 9/1999 | Schofield et al. |
| 6,001,486 | A | 12/1999 | Varaprasad et al. |
| 6,310,611 | B1 | 10/2001 | Caldwell |
| 6,320,282 | B1 | 11/2001 | Caldwell |
| 6,627,918 | B2 | 9/2003 | Getz et al. |
| 7,038,577 | B2 | 5/2006 | Pawlicki et al. |
| 7,224,324 | B2 | 5/2007 | Quist et al. |
| 7,253,723 | B2 | 8/2007 | Lindahl et al. |
| 7,720,580 | B2 | 5/2010 | Higgins-Luthman |
| 7,855,755 | B2 | 12/2010 | Weller et al. |
| 9,405,120 | B2 | 8/2016 | Graf et al. |
| 9,886,637 | B1 | 2/2018 | Chan et al. |
| 11,493,918 | B2 | 11/2022 | Singh |
| 2011/0254956 | A1* | 10/2011 | Ishikawa .............. B60W 50/14 |
| | | | 348/148 |
| 2011/0257846 | A1 | 10/2011 | Bennett |
| 2014/0022390 | A1 | 1/2014 | Blank et al. |
| 2014/0293169 | A1 | 10/2014 | Uken et al. |
| 2014/0336876 | A1 | 11/2014 | Gieseke et al. |
| 2015/0009010 | A1 | 1/2015 | Biemer |
| 2015/0015710 | A1 | 1/2015 | Tiryaki |
| 2015/0022664 | A1 | 1/2015 | Pflug et al. |
| 2015/0092042 | A1 | 4/2015 | Fursich |
| 2015/0232030 | A1 | 8/2015 | Bongwald |
| 2015/0277735 | A1 | 10/2015 | Gibson |
| 2015/0294169 | A1 | 10/2015 | Zhou et al. |
| 2015/0296135 | A1 | 10/2015 | Wacquant et al. |
| 2015/0352953 | A1 | 12/2015 | Koravadi |
| 2016/0052391 | A1 | 2/2016 | Walsh et al. |
| 2016/0137126 | A1 | 5/2016 | Fursich et al. |
| 2016/0209647 | A1 | 7/2016 | Fursich |
| 2017/0274906 | A1 | 9/2017 | Hassan et al. |
| 2018/0107214 | A1* | 4/2018 | Chandy ............... B62D 15/025 |
| 2019/0049954 | A1* | 2/2019 | Mitchell ............ H04L 63/1425 |
| 2023/0271620 | A1* | 8/2023 | Chan ...................... H04N 19/17 |
| | | | 382/104 |

* cited by examiner

| right hand | | | | | | | | | | | | | |
| left hand | | | | | | | | | | | | | |

| | 6 | 2 | 4 | 16 | 17 | 18 | 9 | 40 | 42 | 0 |
|---|---|---|---|---|---|---|---|---|---|---|
| 5 | 100% | 90% | 80% | 70% | 70% | 70% | 50% | 50% | 50% | 40% |
| 1 | 90% | 70% | 70% | 40% | 40% | 40% | 40% | 40% | 40% | 30% |
| 3 | 80% | 70% | 60% | 40% | 40% | 40% | 30% | 30% | 30% | 30% |
| 8 | 50% | 40% | 30% | 20% | 20% | 20% | 10% | 10% | 10% | 10% |
| 16 | 70% | 60% | 50% | 40% | 40% | 40% | 20% | 20% | 20% | 20% |
| 17 | 70% | 60% | 50% | 40% | 40% | 40% | 20% | 20% | 20% | 20% |
| 18 | 70% | 60% | 50% | 40% | 40% | 40% | 20% | 20% | 20% | 20% |
| 41 | 40% | 40% | 30% | 20% | 20% | 20% | 10% | 10% | 10% | 10% |
| 0 | 50% | 40% | 30% | 20% | 20% | 20% | 20% | 10% | 10% | 10% |

VEHICLE DRIVING ASSIST SYSTEM WITH DRIVER ATTENTIVENESS ASSESSMENT

CROSS REFERENCE TO RELATED APPLICATIONS

The present application is a continuation of U.S. patent application Ser. No. 15/889,397, filed Feb. 6, 2018, now U.S. Pat. No. 11,493,918, which claims the filing benefits of U.S. provisional application Ser. No. 62/457,393, filed Feb. 10, 2017, which is hereby incorporated herein by reference in its entirety.

FIELD OF THE INVENTION

The present invention relates generally to a vehicle control system for a vehicle and, more particularly, to a vehicle vision system that utilizes one or more cameras and/or sensors in a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or control system for a vehicle that utilizes one or more touch sensors to sense a driver's touch and one or more cameras to capture image data representative of images interior of the vehicle, and is operable to determine a driver's attentiveness level via determination of the driver's hand positions and/or foot positions and/or a driver profile or driver characteristics.

These and other objects, advantages, purposes and features of the present invention will become apparent upon review of the following specification in conjunction with the drawings.

LEGEND

Figure 1:
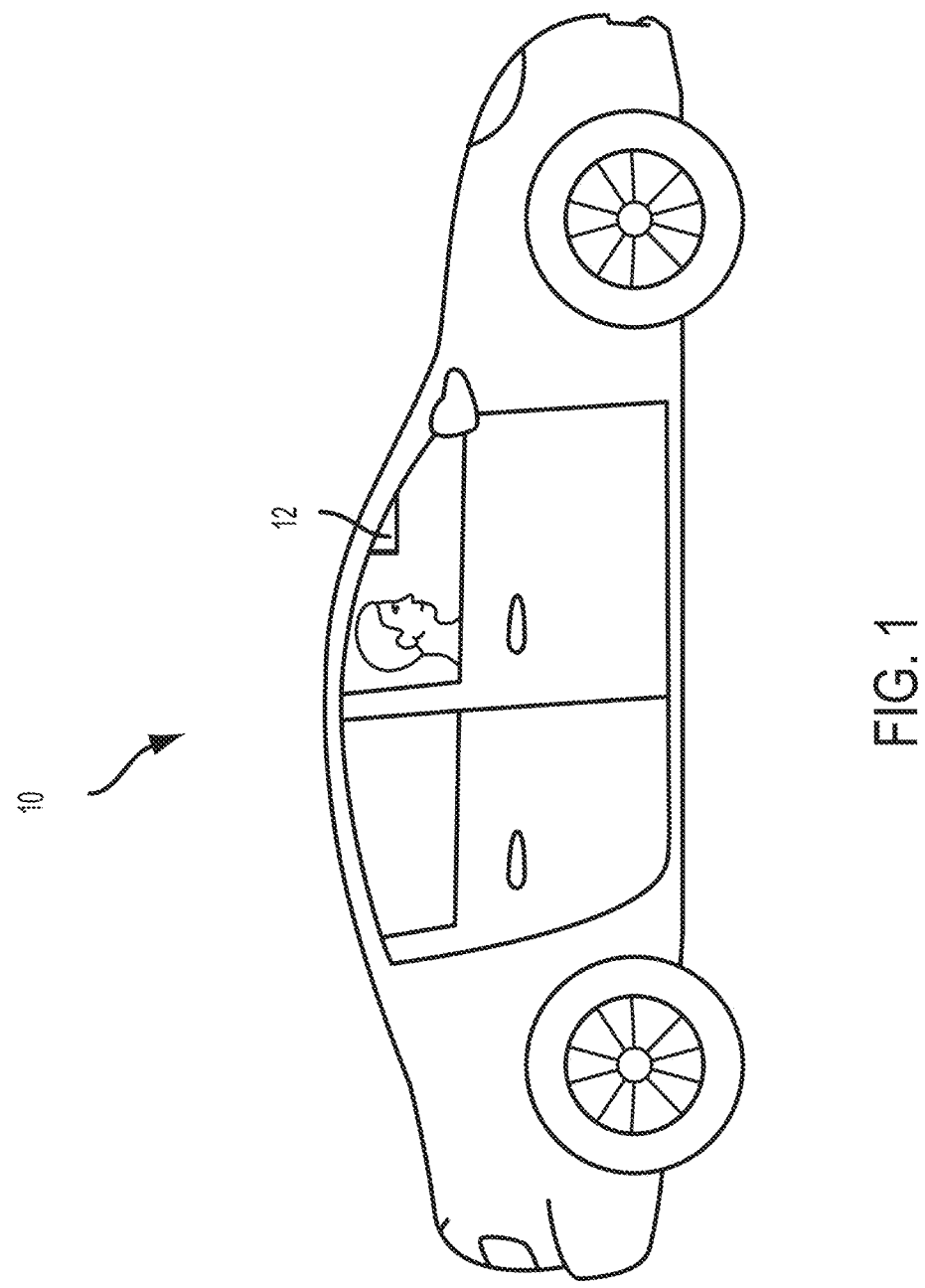
FIG. 1 is a plan view of a vehicle with a system that incorporates sensors and/or cameras in accordance with the present invention.
Figure 2A:
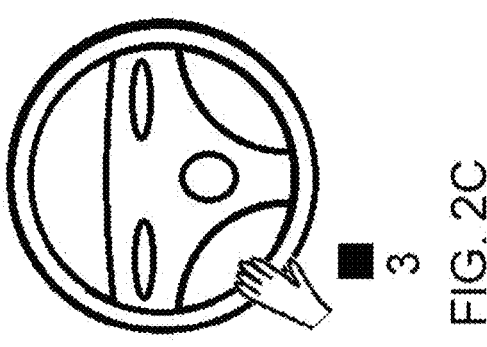
FIGS. 2A-C are plan views of a steering wheel of a vehicle, showing various hand positions 1, 2, 3 of a driver of the vehicle.
Figure 3A:
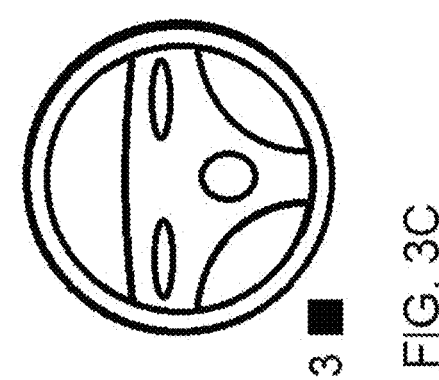
FIGS. 3A-C are plan views of the steering wheel of FIGS. 2A-C, showing locations where the system may detect hand positions of the driver of the vehicle.
Figure 2B:
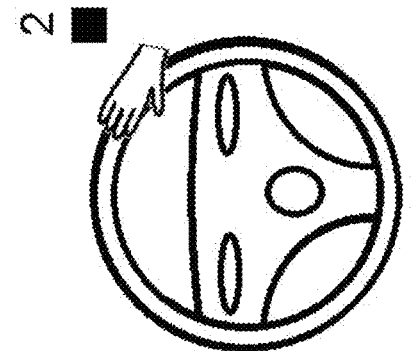
Figure 3B:
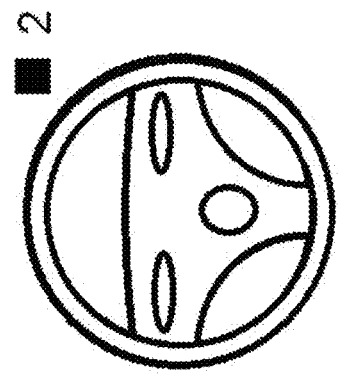
Figure 2C:
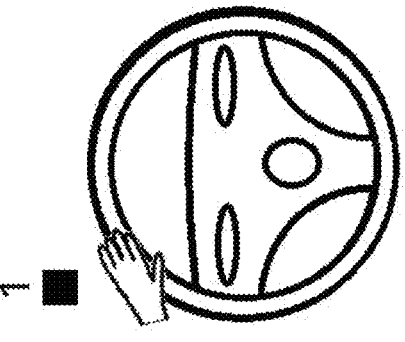
Figure 3C:
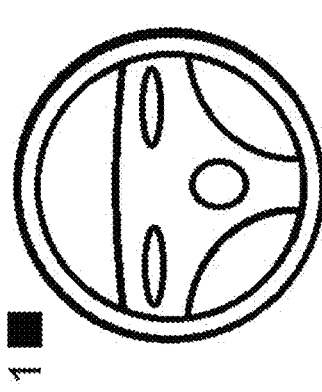
Figures 4A, 4B, 4C, 5A, 5B, 5C:
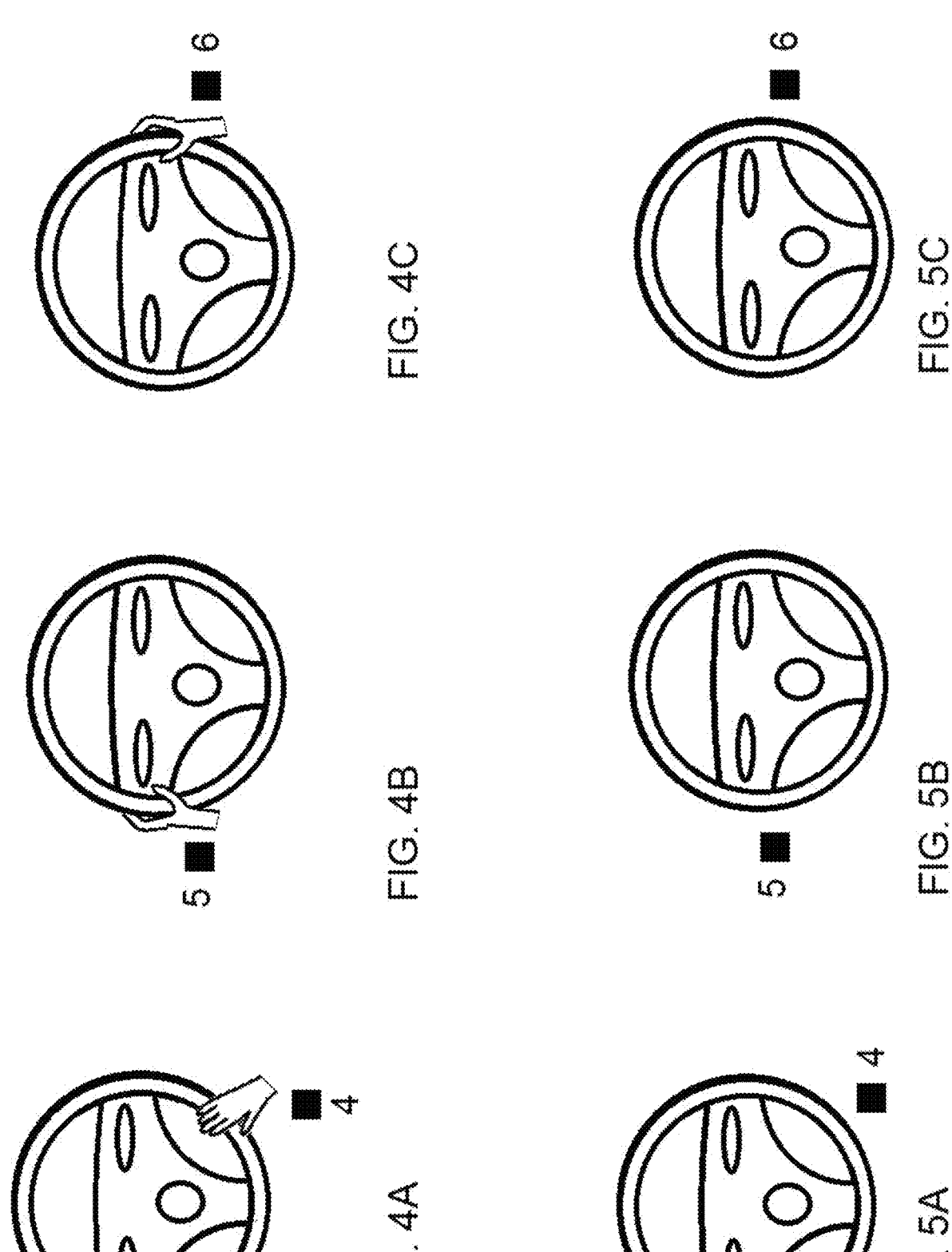
FIGS. 4A-C are plan views of the steering wheel of the vehicle, showing various hand positions 4, 5, 6 of a driver of the vehicle.
FIGS. 5A-C are plan views of the steering wheel of FIGS. 4A-C, showing locations where the system may detect hand positions of the driver of the vehicle.
Figure 6:
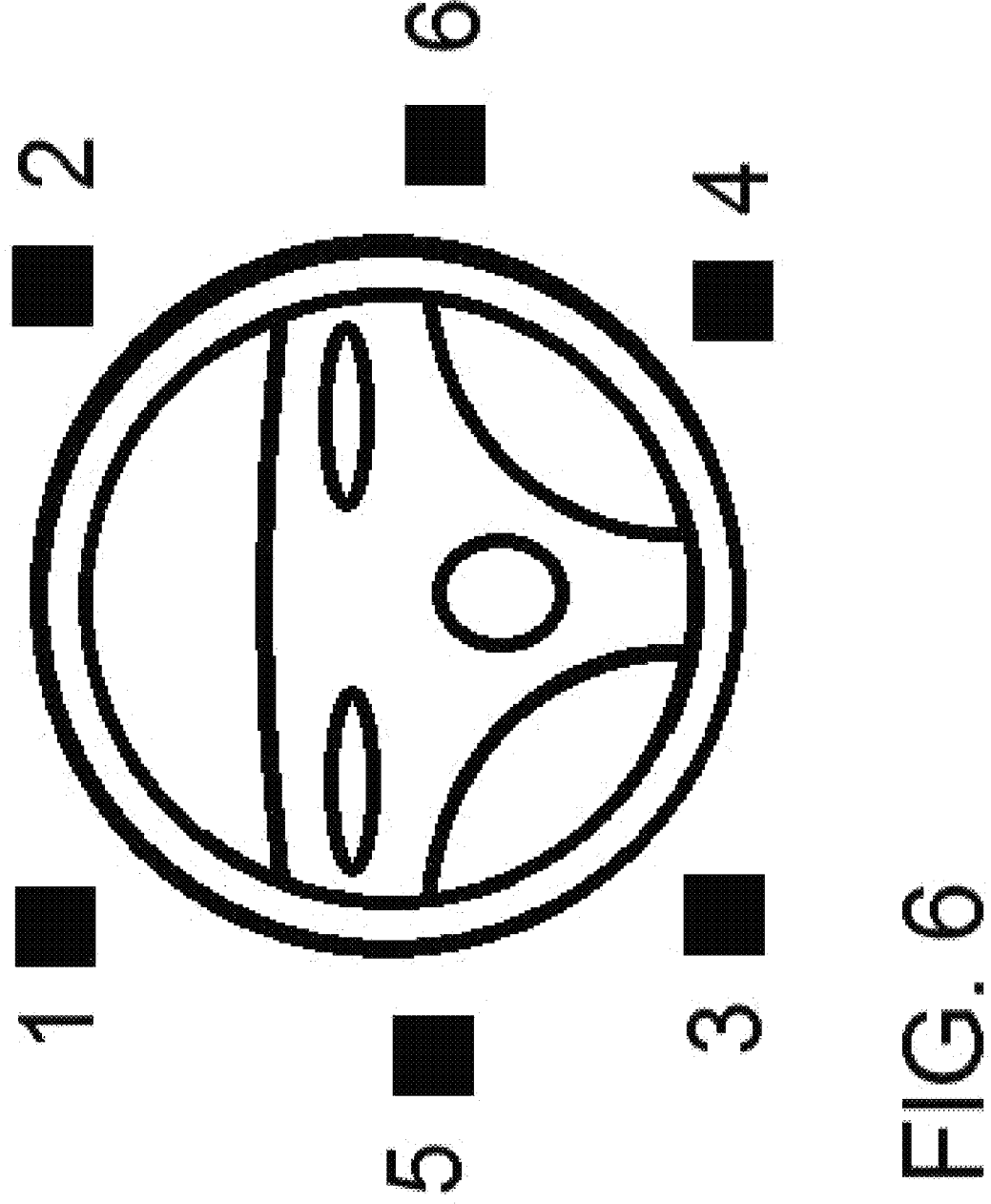
FIG. 6 is a plan view of the steering wheel, showing driver hand positions 1-6.
Figure 7B:
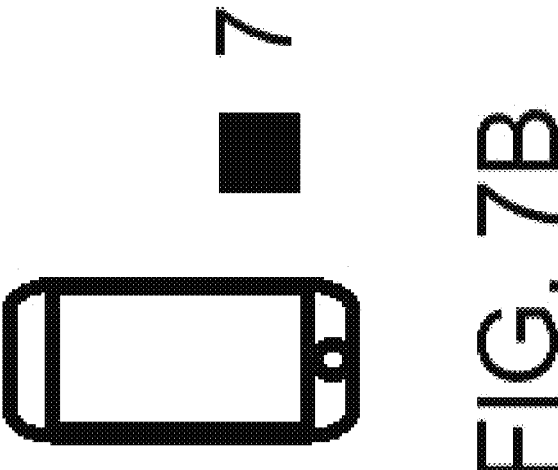
FIGS. 7A and 7B are plan views of a driver's smart phone, showing where a driver's hand may be detected at the smart phone.
Figure 7A:
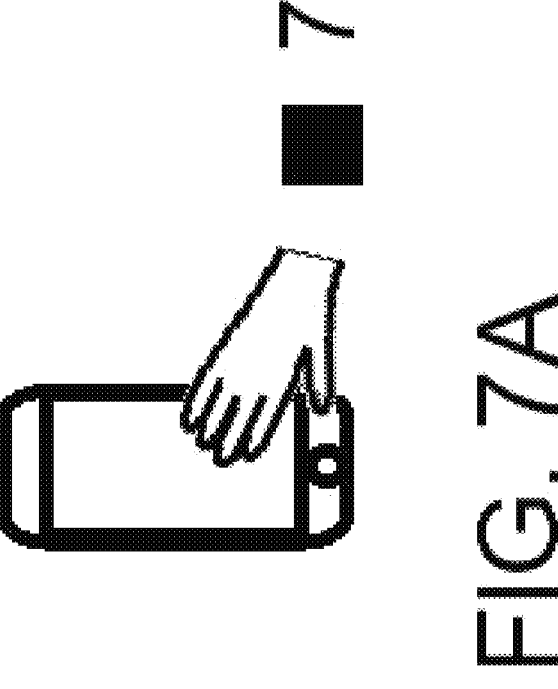
Figure 8:
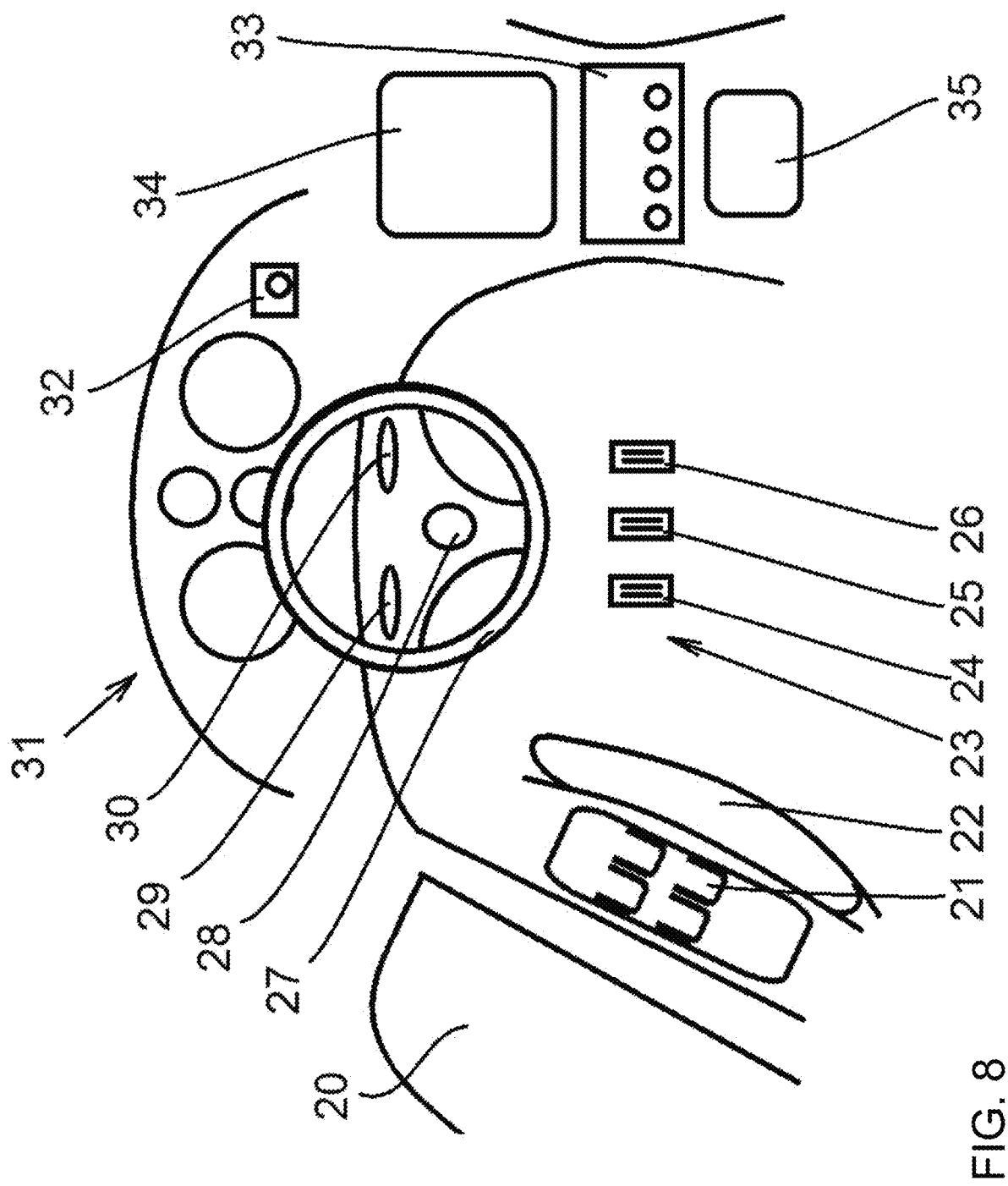
FIG. 8 is a view of the interior cabin of the vehicle, showing various hand and foot locations for the driver of the vehicle.
Figure 9:
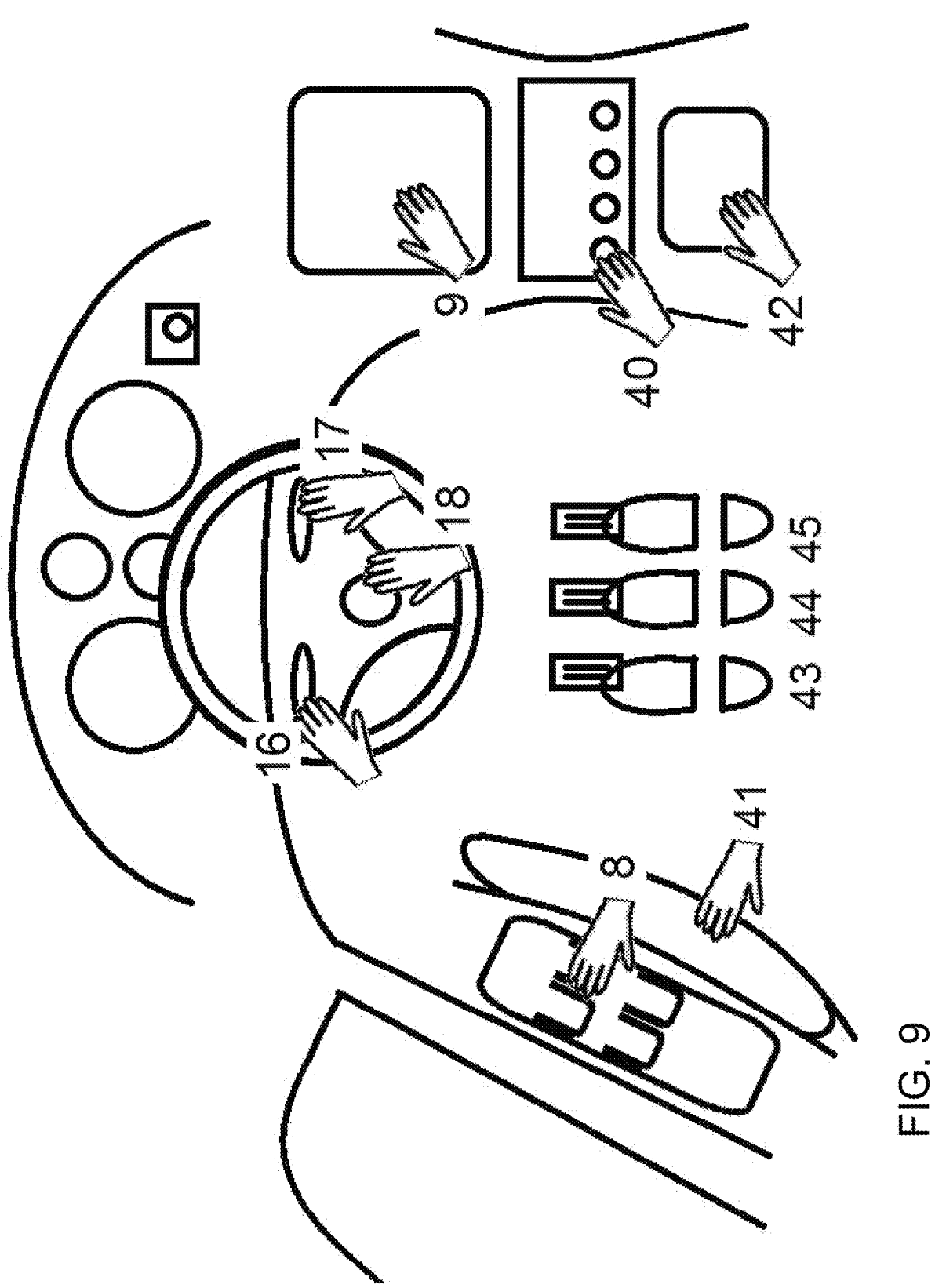
FIG. 9 is another view of the interior cabin of the vehicle, showing the driver's possible hand and foot locations at various controls and pedals, with the hands not being at any of the driving locations at the steering wheel.

20 Side window
21 Window lifter switch panel
22 Door compartment
23 Foot well area
24 Clutch pedal
25 Brake pedal
26 Accelerator pedal
27 Steering wheel
28 Signal-horn button A
29 Signal-horn button B
30 Signal-horn button C
31 Instrument cluster
32 Driver camera
33 Central cluster
34 [Touch] screen
35 Central compartment
36 Bottle holder
37 Arm rest
38 Arm rest compartment
Touch Inputs
  1 Steering wheel left top
  2 Steering wheel right top
  3 Steering wheel left bottom
  4 Steering wheel right bottom
  5 Steering wheel left center
  6 Steering wheel right center
  7 Smart phone
  8 Window lifter switch panel
  9 [Touch] screen
40 Central cluster
41 Door compartment
42 Central compartment
43 Clutch pedal
44 Brake pedal
45 Accelerator pedal

DESCRIPTION OF THE PREFERRED EMBODIMENTS

A vehicle control system and/or driving assist system and/or driver attentiveness detection system and/or alert system operates to capture image data and/or to detect proximity or touch of a driver interior of the vehicle and may process the sensed or captured data to determine the driver's attentiveness and/or alertness while driving the vehicle. The vision system includes a control having an image processor or image processing system that is operable to receive image data from one or more cameras and process the image data and having a sensor processor that receives sensor data or outputs from one or more touch/proximity sensors in the vehicle and processes the sensor date to determine the driver attentiveness.

Referring now to the drawings and the illustrative embodiments depicted therein, a vehicle 10 may include an imaging system or vision system that includes at least one exterior viewing imaging sensor or camera, such as a forward viewing camera 12 disposed at the windshield of the vehicle and viewing through the windshield and forward of the vehicle (FIG. 1), such as for a machine vision system (such as for traffic sign recognition, headlamp control, pedestrian detection, collision avoidance, lane marker detection and/or the like). Optionally, the vision system may include multiple exterior viewing imaging sensors or cameras, such as a rearward viewing imaging sensor or camera, a forwardly viewing camera at the front of the vehicle, and a sideward/rearward viewing camera at respective sides of the vehicle. The camera(s) captures image data representative of the scene exterior of the vehicle, with the camera having a lens for focusing images at or onto an imaging array or imaging plane or imager of the camera. The vision system includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

Vehicle driver assistant systems (DAS), such as, for example, Lane Keep Assistance systems (LKA) and piloted or autonomous or semi-autonomous driving systems with required driver supervision according to SAE Level 3 have the task either to support the driver to do his or her driving task or sometimes to hand over the driving task from autonomous driving to the driver when driving piloted. For example, when the vehicle is traveling along a highway, the system may provide autonomous control of the vehicle, but when the vehicle approaches a highway exit, the driver should or may have to take over control of the vehicle for decelerating properly and maneuvering the vehicle through the exit's curve.

When driving assisted, in most cases at which the driver is highly attentive, the system's warnings and interventions may be felt more or less anxious or overprotective and may often bother the driver, which may lead to the driver disengaging the according DAS. For example, the driver may tend to shorten the distance to the vehicle at the same lane ahead, when preparing for an overtaking maneuver on a highway. An Adaptive Cruise Control (ACC) system may intervene by braking when underrunning the set desired distance to the vehicle ahead. This may not benefit the overtaking maneuver that the driver had in mind.

When all of a sudden the driving situation may become more demanding or when the driver is getting increasingly tired or inattentive, the driver may indeed be in the need of or may benefit from having the DAS engaged, even though the driver may have disengaged the DAS system earlier. DAS systems may assess the last possible point at which the system can start braking for severe driving situations.

The system of the present invention aims to increase the benefit and comfort of driving assistant systems to the drivers by adapting the level of assistance, by that parameters of one or more driver assistance systems, to the determined attentive level of the driver. Some drowsiness detection or assessment systems often take the steering wheel, pedal interaction and the driver's eye gaze into account. For example, erratic or low dynamic in the acceleration pedal and steering wheel interaction, such as for long steady periods, lead to the assessment of a tired driver. For example, when the system determines that the driver turns his or her eyes away from the driving task, such determination may lead to system conditions (adapted) at which warnings to driving situations get engaged earlier. Some systems use in cabin cameras for detecting the driver's eye position and gaze. Some systems use outside cameras for detecting lane deviations. Some systems analyze the driver's facial expression to determine the driver's mood.

For specifiable and testable entry conditions on which the DAS may be adapted, it may be beneficial to have concrete, digital, binary or at least limited states rather than somewhat vague, analog information. Analog conditions may be digitized by binning these in intervals. The system of the present invention uses an advanced data analysis using driver state input data for assessing whether the driver is attentive or distracted.

The inputs for the system of the present invention may include:

The driver has his or her left hand on the left top of the steering wheel 27, hand position 1, the driver has his or her left hand on the steering wheel's right top, hand position 2, the driver has his or her left hand on the steering wheel's left bottom, hand position 3, the driver has his or her left hand on the steering wheel's right bottom, hand position 4, the driver has his or her left hand on the steering wheel's left center, hand position 5, the driver has his or her left hand on the steering wheel's right center, hand position 6, the driver has his or her right hand on the steering wheel's left top, hand position 1, the driver has his or her right hand on the steering wheel's right top, hand position 2, the driver has his or her right hand on the steering wheel's left bottom, hand position 3, the driver has his or her right hand on the steering wheel's right bottom, hand position 4, the driver has his or her right hand on the steering wheel's left center, hand position 5, the driver has his or her right hand on the steering wheel's right center, hand position 6, The driver has his or her hands on the smart phone, hand position 7, The driver uses the window lifter switches 21 with any hand, hand position 8, The driver uses a touch screen, such as, for example, the touch screen 34 in the center console, hand position 9, The driver uses or adjusts any knobs or switches, such as, for example, adjusting knobs at the center console 33 or radio, hand position 40, The driver is honking by touching the horn buttons 28, 29 and 30 at the steering wheel with any hand, hand positions 16, 17 and 18, The driver reaches into the door compartment 22, hand position 41, and/or The driver reaches into the central compartment 35, hand position 42.

The system may also or otherwise take into account the operation of all possible pedals (in the foot well area 23 in front of the driver seat of the vehicle) all together as inputs, including the clutch pedal 24, foot position 43, the brake pedal 25, foot position 44, and the accelerator pedal 26, foot position 45.

All these inputs are directly detectable without additional sensors with the exception of the two named compartments 22 and 35. Sensors, such as capacitive based ones, may be utilized for detecting a person's hand reaching into the compartment (such as may be used for ambient light control). Additionally, in cabin proximity sensors are typically used for display control, button backlight control, hand gesture detection or for haptic feedback, and work on capacitive measuring principles or optically using time of flight measuring principles, such as by utilizing aspects of the systems described in International Publication No. WO 2013/109869 and/or U.S. Publication No. US-2015-0277735, which are hereby incorporated herein by reference in their entireties.

Either by running in-cabin camera image data machine vision algorithms, other kinds of in-cabin sensors (such as discussed above, such as, for example, proximity sensors) or by acquiring a driver profile and vehicle system's state parameters, the system of the present invention may gain additional input:

The vehicle is in motion and at which speed (for example, 0 . . . 15 km/h, 15 . . . 30 km/h, etc.), The vehicle speed exceeds the current speed limit and by how much, The time of day (day time/night time), The season (winter, no winter), The weather conditions (sunny, cloudy, raining, hailing, snowing, foggy), The road conditions (dry, muddy snow, soft snow, compressed snow, icy, water on road, hail on road, rain just started), The driver's age, Whether one or more windows are open, Whether the rooftop is open, How warm the heating is engaged in comparison to the season and weather conditions, Whether any vehicle fail state or condition warning is on (bothering), such as, for example, a low tire pressure warning is constantly binging, The driver's driving education level, The driver's driving experience, The driver has driven the vehicle earlier and how long his or her experience is with the according ego or subject vehicle, The driver has driven in the according country earlier and how long his or her experience is in that country, The driver has driven the according road earlier and how long his or her experience is with that road, How much experience the driver has in driving the according speed (some interval) according the road type, season, time of day and weather conditions, How much experience the driver has keeping the vehicle within a lane, How much experience the driver has passing curves according the road type, season, time of day and weather conditions, such as, for example, driving on an Alps mountain pass at night, in snowy conditions in January at below freezing conditions (e.g., −5 degrees C.).

Thus, the driver attentiveness detection system of the present invention may take especially the driver's hand positions into account for assessing whether the driver is attentive or how far he or she is able to take back control when the vehicle is being driven autonomously.

Figure 10:
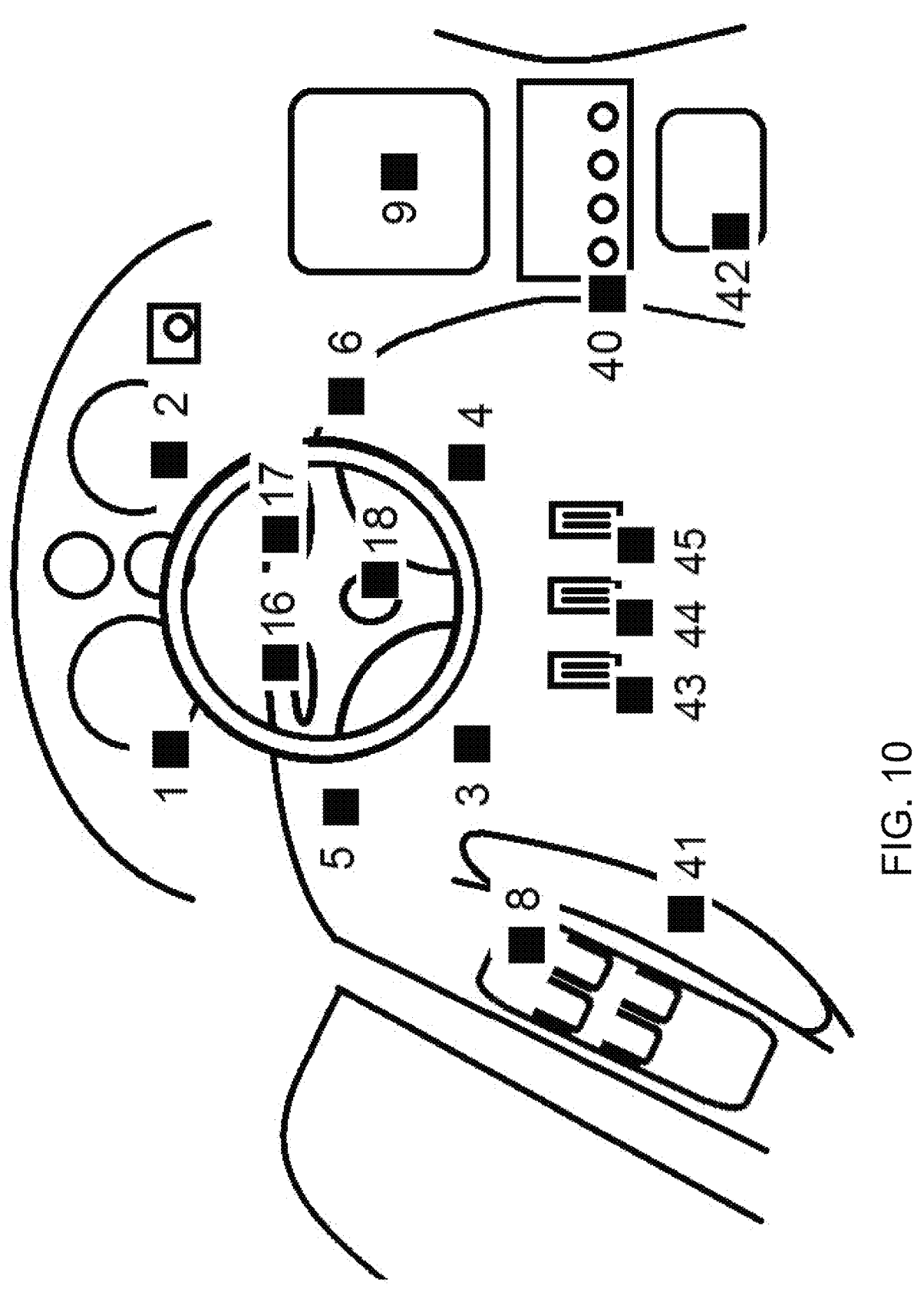
FIG. 10 is another view of the interior cabin of the vehicle, showing various hand and foot locations for the driver of the vehicle, including hand positions on and off of the steering wheel.
Figure 11:
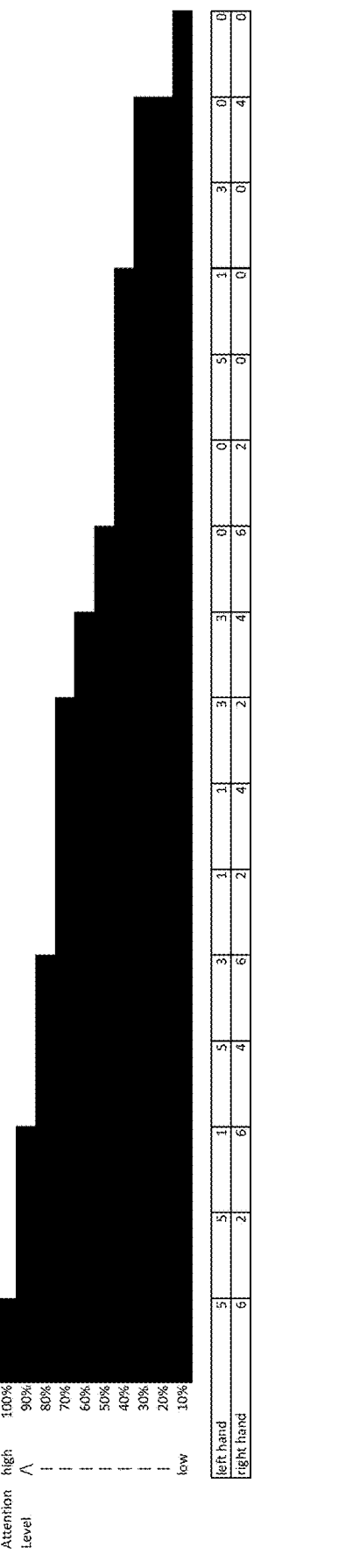
FIG. 11 is a graph showing determined attentiveness levels depending on the determined hand positions of the driver relative to the vehicle steering wheel.

In the example of FIG. 11 (showing the system's determined attentiveness level responsive to the driver's hand positions at the steering wheel), just the possible hand positions 1, 2, 3, 4, 5 and 6 of FIGS. 2A-6 at the steering wheel, without the possible horn switch positions 16, 17 and 18 (FIG. 10), have been put into a relation to the assessed attention level the driver may have at a specific moment. Hand position 0 may be representative of the driver having his or her hand off the steering wheel.

Figure 12:
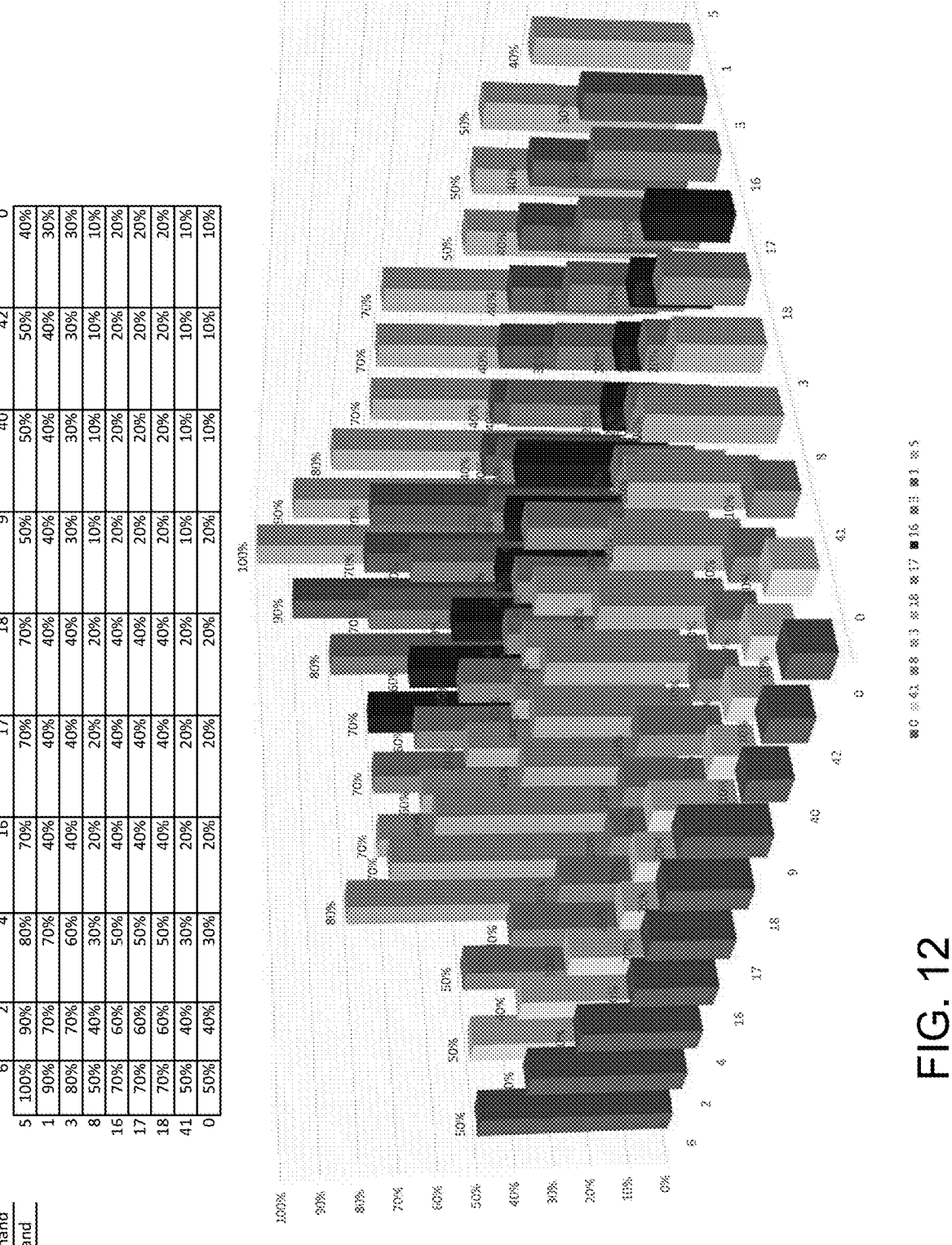
FIG. 12 is a graph showing determined attentiveness levels depending on the determined hand positions of the driver at various locations in the vehicle cabin, including the steering wheel and console and door area.

In the example of FIG. 12, all possible hands positions 1, 2, 3, 4, 5, 6, 8, 9, 16, 17, 18, 40, 41, 42, such shown in FIG. 10, have been put into a relation to the assessed attention level the driver may have at a specific moment. Again, hand position 0 may be to have the hand off the steering wheel. Both examples show that grabbing the steering wheel at position 5 (with the left hand) and position 6 (with the right hand) leads to the highest attentiveness score. Possibly resting the arms on the lap, putting the hands on lower steering wheel positions 3 and 4 may lead to a reduced attentiveness score of 60 percent. Bumping the horn may lead to turn the attention away from the whole to just specific areas of the outside scenery, leading to a reduced score. Reaching in the compartments, using the touch screen, tuning the radio or switching the window lifters may lead to a reduced score as well. The score is minimal when both hands are off the steering wheel, grabbing at or reaching toward two other positions left and right associated with distraction.

The attentiveness assessment may optionally take the above named driver profile and vehicle system's state parameters into account. Either each of the single driver profile parameters or vehicle system's state parameters may have a single score which may lead to a percentage with which the attentiveness score gets multiplied (so diminished when below 100 percent) each by each, or there may be a multi-dimensional look up table with all parameters scored in all possibly occurring combinations. Of course good weather, high experience and good education may lead to a bonus in the attentiveness score. Distracting things such as vehicle fail states or rooftop open may lead to a reduction in the attentiveness assessment score. A freezing person may less likely fall asleep as compared to a driver having the heating on and cozy conditions. In summer time, a driver sweating from heat may be less attentive than a driver having the air conditioning running, and both may be reflected in the scoring look up table setting.

Thus, the system of the present invention determines hand or touch locations of a driver of a vehicle to determine driver attentiveness or the driver's ability to quickly take over control of the vehicle when the vehicle is being autonomously or semi-autonomously controlled. The system may also take into account the driver's feet positions and pedal usage. The system may also take into account the driver's driving experience level or the like, and may further take into account the road conditions or driving conditions. Responsive to a determined attentiveness score, the system may determine if the driver is capable of assuming control of the vehicle or if the vehicle should remain under autonomous or semi-autonomous control.

The system may utilize inputs or sensors, such as touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or U.S. Publication Nos. US-2014-0022390 and/or US-2014-0293169, which are hereby incorporated herein by reference in their entireties, or such as proximity sensors of the types described in U.S. Pat. Nos. 7,224,324; 7,249,860 and/or 7,446,924, and/or International Publication No. WO 2004/058540, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and/or 6,369,804, which are hereby incorporated herein by reference in their entireties, and/or the like, while remaining within the spirit and scope of the present invention.

The system may utilize aspects of head and face direction and position tracking systems and/or eye tracking systems and/or gesture recognition systems. Such head and face direction and/or position tracking systems and/or eye tracking systems and/or gesture recognition systems may utilize aspects of the systems described in U.S. Publication Nos. US-2016-0137126; US-2015-0352953; US-2015-0296135; US-2015-0294169; US-2015-0232030; US-2015-0022664; US-2015-0015710; US-2015-0009010 and/or US-2014-0336876, which are hereby incorporated herein by reference in their entireties.

The system may also utilize one or more cameras or imaging sensors. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as one or more exterior viewing cameras that capture image data for a driver assistance system of the vehicle, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driving assist system, the vehicular driving assist system comprising:

a camera disposed in a vehicle equipped with the vehicular driving assist system and at least viewing driver hand positions of hands of a driver present in the vehicle;

an electronic control unit (ECU) comprising a processor that processes image data captured by the camera;

wherein the vehicular driving assist system determines driver hand positions via processing at the ECU of image data captured by the camera;

wherein the vehicular driving assist system identifies, from a plurality of discrete positions, a discrete position corresponding to the determined driver hand positions;

wherein the plurality of discrete positions includes (i) a plurality of discrete positions at a steering wheel of the vehicle, and (ii) a plurality of discrete positions at an interior portion of the vehicle and not at the steering wheel of the vehicle, and wherein the plurality of discrete positions at the interior portion of the vehicle and not at the steering wheel of the vehicle comprise at least one selected from the group consisting of (a) an infotainment control of the vehicle, (b) a vehicle system switch of the vehicle and (c) a storage compartment of the vehicle;

wherein the vehicular driving assist system, responsive to processing at the ECU of image data captured by the camera, determines a level of attentiveness of the driver, and wherein each of the plurality of discrete positions is assigned a respective attentiveness score, and wherein the level of attentiveness is determined by (i) determining an initial attentiveness score based on the respective attentiveness score corresponding to the determined driver hand positions and (ii) modifying the initial attentiveness score by a multiplier derived from at least one vehicle system state parameter to generate the determined level of attentiveness of the driver; and wherein a level of driving assistance of the vehicle provided by the vehicular driving assist system is adapted based at least in part on the determined level of attentiveness of the driver.

2. The vehicular driving assist system of claim 1, wherein the determined level of attentiveness of the driver is between a zero percent determined level of attentiveness of the driver and a 100 percent determined level of attentiveness of the driver.

3. The vehicular driving assist system of claim 1, wherein the respective attentiveness score assigned to each discrete position of the plurality of discrete positions is between a zero percent determined level of attentiveness of the driver and a 50 percent determined level of attentiveness of the driver.

4. The vehicular driving assist system of claim 1, wherein the determined driver hand positions comprise (i) a left hand driver hand position of a left hand of the driver, and (ii) a right hand driver hand position of a right hand of the driver.

5. The vehicular driving assist system of claim 1, wherein the vehicular driving assist system provides at least a level of semi-autonomous control of the vehicle responsive to the determined level of attentiveness being below a first threshold level of attentiveness of the driver.

6. The vehicular driving assist system of claim 5, wherein, with the vehicular driving assist system providing at least the level of semi-autonomous control of the vehicle, the vehicular driving assist system allows the driver to assume manual control of the vehicle responsive to the determined level of attentiveness of the driver being above a second threshold level of attentiveness of the driver that is indicative of the driver being more attentive than the first threshold level of attentiveness of the driver.

7. The vehicular driving assist system of claim 1, wherein the vehicular driving assist system adapts the level of driving assistance to allow the driver to manually control the vehicle responsive to the determined level of attentiveness of the driver being above a threshold level.

8. The vehicular driving assist system of claim 1, wherein the vehicular driving assist system provides autonomous control of the vehicle based at least in part on the determined level of attentiveness of the driver.

9. The vehicular driving assist system of claim 1, wherein the level of driving assistance provided by the vehicular driving assist system is adapted by adjusting one or more parameters of the vehicular driving assist system.

10. The vehicular driving assist system of claim 1, wherein the multiplier is further derived from a driver profile of the driver of the vehicle.

11. The vehicular driving assist system of claim 10, wherein the driver profile includes information pertaining to driving experience of the driver.

12. The vehicular driving assist system of claim 11, wherein the driver profile includes information pertaining to driving experience of the driver for driving conditions encountered by the vehicle when the vehicular driving assist system is determining the level of attentiveness of the driver.

13. A vehicular driving assist system, the vehicular driving assist system comprising:

a camera disposed in a vehicle equipped with the vehicular driving assist system and at least viewing driver hand positions of hands of a driver present in the vehicle;

an electronic control unit (ECU) comprising a processor that processes image data captured by the camera;

wherein the vehicular driving assist system determines a left hand driver hand position of a left hand of the driver and a right hand driver hand position of a right hand of the driver via processing at the ECU of image data captured by the camera;

wherein the vehicular driving assist system identifies, from a plurality of discrete positions, a discrete position corresponding to the determined left hand driver hand position and the determined right hand driver hand position;

wherein the plurality of discrete positions includes (i) a plurality of discrete positions at a steering wheel of the vehicle, and (ii) a plurality of discrete positions at an interior portion of the vehicle and not at the steering wheel of the vehicle, and wherein the plurality of discrete positions at the interior portion of the vehicle and not at the steering wheel of the vehicle comprise at least one selected from the group consisting of (a) an infotainment control of the vehicle, (b) a vehicle system switch of the vehicle and (c) a storage compartment of the vehicle;

wherein the discrete positions of the plurality of discrete positions are assigned respective attentiveness values;

wherein the vehicular driving assist system, responsive to processing at the ECU of image data captured by the camera, determines a level of attentiveness of the driver, and wherein the level of attentiveness is determined by (i) determining an initial attentiveness score based on the respective attentiveness score corresponding to the determined left hand driver hand position and the determined right hand driver hand position and (ii) modifying the initial attentiveness score by a multiplier derived from at least one vehicle system state parameter to generate the determined level of attentiveness of the driver; and wherein a level of driving assistance of the vehicle provided by the vehicular driving assist system is adapted based at least in part on the determined level of attentiveness of the driver.

14. The vehicular driving assist system of claim 13, wherein the determined level of attentiveness of the driver is between a zero percent determined level of attentiveness of the driver and a 100 percent determined level of attentiveness of the driver.

15. The vehicular driving assist system of claim 13, wherein the respective attentiveness value assigned to each discrete position of the plurality of discrete positions is between a zero percent determined level of attentiveness of the driver and a 50 percent determined level of attentiveness of the driver.

16. The vehicular driving assist system of claim 13, wherein the vehicular driving assist system provides at least a level of semi-autonomous control of the vehicle responsive to the determined level of attentiveness being below a first threshold level of attentiveness of the driver.

17. The vehicular driving assist system of claim 13, wherein the multiplier is further derived from a driver profile of the driver of the vehicle.

18. The vehicular driving assist system of claim 17, wherein the driver profile includes information pertaining to driving experience of the driver.

19. The vehicular driving assist system of claim 18, wherein the driver profile includes information pertaining to driving experience of the driver for driving conditions encountered by the vehicle when the vehicular driving assist system is determining the level of attentiveness of the driver.

20. A vehicular driving assist system, the vehicular driving assist system comprising:

a camera disposed in a vehicle equipped with the vehicular driving assist system and at least viewing driver hand positions of hands of a driver present in the vehicle;

an electronic control unit (ECU) comprising a processor that processes image data captured by the camera;

wherein the vehicular driving assist system determines a left hand driver hand position of a left hand of the driver and a right hand driver hand position of a right hand of the driver via processing at the ECU of image data captured by the camera;

wherein the vehicular driving assist system identifies, from a plurality of discrete positions, a discrete position corresponding to the determined driver hand positions;

wherein the plurality of discrete positions includes (i) a plurality of discrete positions at a steering wheel of the vehicle, and (ii) a plurality of discrete positions at an interior portion of the vehicle and not at the steering wheel of the vehicle, and wherein the plurality of discrete positions at the interior portion of the vehicle and not at the steering wheel of the vehicle comprise at least one selected from the group consisting of (a) an infotainment control of the vehicle, (b) a vehicle system switch of the vehicle and (c) a storage compartment of the vehicle;

wherein the vehicular driving assist system, responsive to processing at the ECU of image data captured by the camera, determines a level of attentiveness of the driver, and wherein each of the plurality of discrete positions is assigned a respective attentiveness score, and wherein the level of attentiveness is determined by (i) determining an initial attentiveness score based on the respective attentiveness score corresponding to the determined left hand driver hand position and the determined right hand driver hand position and (ii) modifying the initial attentiveness score by a multiplier derived from at least one vehicle system state parameter to generate the determined level of attentiveness of the drive;

wherein a level of driving assistance of the vehicle provided by the vehicular driving assist system is adapted based at least in part on the determined level of attentiveness of the driver;

wherein the vehicular driving assist system adapts the level of driving assistance to provide at least semi-autonomous control of the vehicle responsive to the determined level of attentiveness being below a first threshold level of attentiveness of the driver; and wherein the vehicular driving assist system adapts the level of driving assistance to allow the driver to manually control the vehicle responsive to the determined level of attentiveness of the driver being above a second threshold level of attentiveness of the driver that is indicative of the driver being more attentive than the first threshold level of attentiveness of the driver.

21. The vehicular driving assist system of claim 20, wherein the determined level of attentive of the driver is between a zero percent determined level of attentiveness of the driver and a 100 percent determined level of attentiveness of the driver.

22. The vehicular driving assist system of claim 20, wherein the respective attentiveness score assigned to each discrete position of the plurality of discrete positions is between a zero percent determined level of attentiveness of the driver and a 50 percent determined level of attentiveness of the driver.

23. The vehicular driving assist system of claim 20, wherein the vehicular driving assist system provides autonomous control of the vehicle based at least in part on the determined level of attentiveness of the driver.

24. The vehicular driving assist system of claim 20, wherein the level of driving assistance provided by the vehicular driving assist system is adapted by adjusting one or more parameters of the vehicular driving assist system.

25. The vehicular driving assist system of claim 20, wherein the multiplier is further derived from a driver profile of the driver of the vehicle.

26. The vehicular driving assist system of claim 25, wherein the driver profile includes information pertaining to driving experience of the driver.

27. The vehicular driving assist system of claim 26, wherein the driver profile includes information pertaining to driving experience of the driver for driving conditions encountered by the vehicle when the vehicular driving assist system is determining the level of attentiveness of the driver.

\* \* \* \* \*